July 18, 1961 C. A. HALONEN 2,993,202
DIGITAL TO ANALOG CONVERTER
Filed June 22, 1959
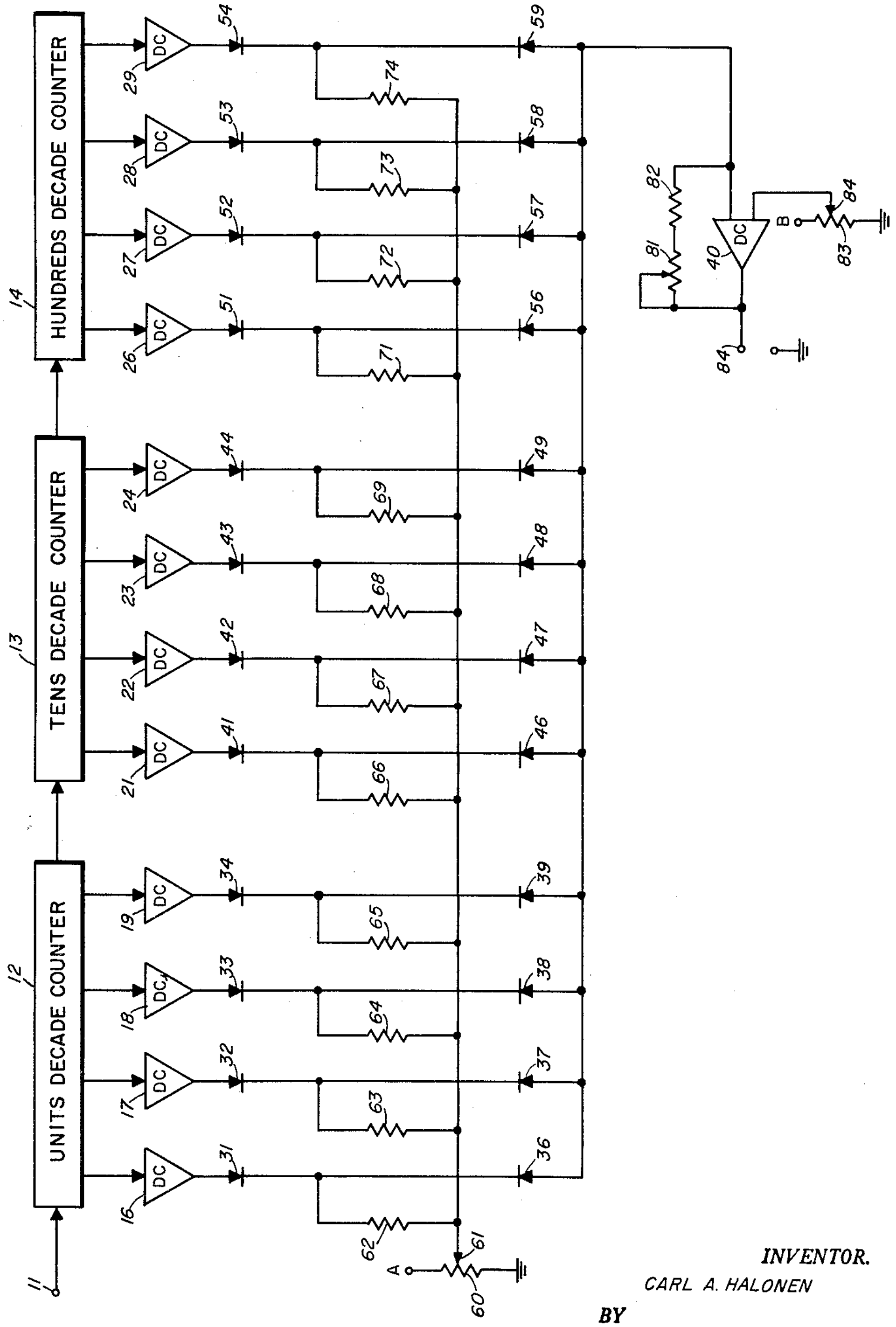
INVENTOR.
CARL A. HALONEN
BY
ATTORNEYS United States Patent Office 2,993,202

Patented July 18, 1961

2,993,202

DIGITAL TO ANALOG CONVERTER

Carl A. Halonen, San Diego, Calif., assignor to the United States of America as represented by the Secretary of the Navy Filed June 22, 1959, Ser. No. 823,801
6 Claims. (Cl. 340—347)
(Granted under Title 35, U.S. Code (1952), sec. 266)

The invention described herein may be manufactured and used by or for the Government of the United States of America for governmental purposes without the payment of any royalties thereon or therefor.

This invention relates to a digital to analog converter and more particularly to a digital to analog converter employing diode switches.

In the prior art the most common method utilized for digital to analog conversion merely added the output currents from decade counters which was proportional in amplitude to the count of the decade counters. The currents were weighted from each of the stages of the decade counters according to the binary count, summed, and usually fed through a D.C. amplifier. The main disadvantage of this prior art system is that the accuracy weighted current is dependent upon the amplitude of the output voltages of the multivibrator stages in the decade counters. The output voltage of the mulivibrators varied because of inconsistencies and variations in the tubes and related components, as well as supply voltages varying with the varying loads imposed by the multivabrators. This of course limited the accuracy which was obtainable from this type of system.

It is thus an object of the present invention to provide digital to analog conversion wherein the accuracy is not dependent upon the varying characteristics of vacuum tubes and associated components.

A further object of the invention is to provide a digital to analog converter in which only one regulated voltage source is utilized.

A still further object of the present invention is to provide a digital to analog converter in which the load on the precision voltage supply does not vary within wide limits.

A further object of the present invention is to provide a digital to analog converter with a minimum of calibration adjustments.

Still another object is to provide a digital to analog converter with a minimum of precision components.

According to the invention, a plurality of decade counters, of the type that provide binary output voltages in accordance with the number of pulses applied thereto, is coupled to the digital source to be converted. The outputs of the decade counters are coupled through D.C. amplifiers to rectifiers. Each rectifier is coupled through a separate precision resistor, having a conductance proportional to the binary count of the output connected thereto, to a precision D.C. voltage source. The quiescent voltage from the amplifiers to the rectifiers place the rectifiers in a conductive state and thereby clamp the resistor side of each rectifier to a particular voltage. Each junction of the rectifier and resistor is coupled through one of a second group of rectifiers to a summing network. When there is no output from the decade counter and the first group of rectifiers are conducting the second group are held at a cutoff potential due to the drop across the resistors. When an output is present from the decade counter to the first group of rectifiers this output merely cuts off the corresponding rectifier, which allows the corresponding rectifier of the second group of rectifiers to conduct to the summing network, which is passed through a D.C. amplifier to the output terminal. Thus, the individual output voltages from the decade counters are not utilized as the adding components of the analog output, but merely to gate each corresponding diode on or off, requiring little or no precision components in the counters. The only precision components involved will be the voltage reference supply, the resistors connected thereto, and the summing network. All of these last mentioned components are readily realizable at modest cost and with minimum adjustment.

Other objects and many of the attendant advantages of this invention will be readily appreciated as the same becomes better understood by reference to the following detailed description when considered in connection with the accompanying drawings in which like reference numerals designate like parts throughout the figures thereof and wherein:

The sole figure illustrates in block and schematic form, the preferred embodiment of the present invention.

Referring now to the drawings, the digital input terminal 11 is connected to the input of the units decade counter 12, which is connected to the tens decade counter 13, which in turn is connected to the hundred decade counter 14. Each decade counter has four output voltages coupled through D.C. amplifiers 16 to 19, 21 to 24, and 26 to 29. The output of D.C. amplifiers 16 to 19 are coupled through rectifiers 31 to 34, and 36 to 39 to the input of amplifier 40. The output of D.C. amplifiers 21 to 24 are coupled through rectifiers 41 to 44 and rectifiers 46 to 49 to the input of amplifier 40. The output of D.C. amplifiers 26 to 29 are coupled through rectifiers 51 to 54 and rectifiers 56 to 59 to the input of D.C. amplifier 40. Resistor 60 is connected between ground and a D.C. reference voltage indicated at A. A sliding contact 61 is connected to resistor 60. Sliding contact 61 is connected to one end of resistors 62 to 69 and 71 to 74. The other end of resistors 62 to 65 is connected to the junctions of rectifiers 31 to 34 and 36 to 39, respectively. The other end of resistors 66 through 69 are connected to the junctions of rectifiers 41 through 44 and 46 through 49, respectively. The other end of resistors 71 through 74 are connected to the junctions of rectifiers 51 through 54 and 56 through 59, respectively. The output of D.C. amplifier 40 is connected through variable resistor 81 and fixed resistor 82 back to the input of amplifier 40. Resistor 83 is connected between voltage B and ground, with a contact 84 coupling a fixed bias to amplifier 40.

*Operation*

Decade counters 12, 13, and 14 can be any of the commercially available scale-of-ten counters of the type that utilizes, for example, four mutlivibrators. Pulses which are to be converted to an analog voltage are applied to input terminal 11 which is the input of the units decade counter 12. The units counter will count from zero to nine pulses and the tenth pulse will reset the units counter to zero and send one pulse to the tens counter. This cycle is repeated until the tens counter and the units counter each reach a count of nine. This indicates that the number of pulses counter is ninety-nine. The one hundredth pulse will reset both counters, the units decade counter 12 and the tens decade counter 13 and send one pulse to the hundreds decade counter. This cycle is repeated until the units decade counter, the tens decade counter, and the hundreds decade counter, each have a count of nine at which time the total count will be nine hundred and ninety-nine. It is to be understood at this point, that, if desired, any number of additional decade counters can be added, depending upon the maximum number of pulses to be counted. Three counters, i.e., the units, tens and hundreds decade counters are illustrated in the interest of simplicity. Isolation D.C. amplifiers 16 through 19 are direct coupled to the four multivibrator outputs of units decade counter 12. Isolation D.C. amplifiers 21 through 24 are direct coupled to the tens decade counter four multivibrator outputs, and isolation D.C. amplifiers 26 through 29 are direct coupled to the outputs of the hundreds decade counter multivibrator.

Assuming that each isolation amplifier is connected to a multivibrator terminal having a normally high potential before a pulse is received, the outputs of the isolation amplifiers are positive by a few volts. This causes the diodes coupled to the amplifier outputs to conduct from the regulated voltage A, which in this embodiment is negative, up through the bank of resistors 62 through 74, and through diodes 31 through 54, clamping all of the junctions of the two sets of diodes, i.e., the tops of the banks of resistors, to a positive potential. Diodes 36 through 39, 46 through 49, and 56 through 59 are tied to a second potential which is more negative in this quiescent state. Thus diodes 36 through 39, 46 through 49, and 56 through 59, are cut off. When the first pulse at input terminal 11 trips the first multivibrator in the units decade counter 12, the voltage at the output of amplifier 16 becomes highly negative which in turn cuts off diode 31. This allows diode 36 to conduct from negative regulated supply A through resistor 62, which in turn supplies current to the summation network consisting of feed-back resistors 81 and 82 of amplifier 40, and appears as an input to amplifiers 40. The magnitude of the input to amplifier 40 at this point depends on the conductance or resistance of resistor 62 and the resistance of summation resistors 81 and 82. This is reversed in polarity through amplification and appears as a positive output at output terminal 84. The magnitude of the output voltage is determined directly by the ratio of the feed-back resistance 81 and 82 to resistance 62 and the magnitude of the reference voltage A;

$$E_{out}=E_{ref}\frac{R\text{ feed-back}}{R62}$$

or $$Eout=(Eref)(R\text{ feed-back})(G62)$$

where G62 is the conductance of R62.

The second pulse will reset the first multivibrator of the units decade counter 12 and trigger the second multivibrator of units decade counter 12. This restores the bias originally applied to diode 36 and removes the bias from diode 37 by cutting off diode 32 and allowing current to flow from the negative supply A through resistor 63, diode 37, and the summation networks 81 and 82. It is pointed out that resistor 63 is exactly one-half the resistance or twice the conductance of resistor 62 resulting in twice the input to D.C. amplifier 40.

The conductance (G) of the remaining resistors are all related to R62 in binary counts. Considering R62 to have a conductance of unity or G then:

| | |
|---|---|
| $G63=2G$ | $G69=40G$ |
| $G64=2G$ | $G71=100G$ |
| $G65=4G$ | $G72=200G$ |
| $G66=10G$ | $G73=200G$ |
| $G67=20G$ | $G74=400G$ |
| $G68=20G$ | |

The third pulse at input terminal 11 will trigger the first multivibrator again, but not affect the second multivibrator, so that the cut off bias is again removed, as previously described, from diode 36 by cutting off diode 31, and current supplied to resistor 62 will again appear as an input to amplifier 40. At this time, with three pulses of input, the total current is that supplied through resistors 62 and 63 which is three times the amount supplied through resistor 62 alone, the case with only one pulse at input terminal 11.

It can now be seen that as the pulse count is totalled in the units counter, the resistors will be gated in the proper combinations to produce a D.C. voltage at the D.C. amplifier input, which will be amplified and supplied at the output as the analog of the pulse count. Resistor 64 has twice the admittance of resistor 62, and resistor 65 has four times the admittance of resistor 62, as is well known in binary counting. The specific circuitry, or detailed block diagram, of the decade counters has been eliminated in the interest of simplicity, since these units are conventional and well known to the computer art, and, in themselves, do not form a part of the invention.

The tenth pulse will reset the units decade counter to zero and trip the first multivibrator in the tens counter. This will cut off diode 41 and allow conduction through resistor 66 and diode 46 to the input of D.C. amplifier 40. Resistor 66 has one-tenth the resistance or ten times the conductance of resistor 62, which results in a current flow ten times as great as that which forms the input to D.C. amplifier 40 through resistor 62. As the count progresses to ninety-nine this process of summing current increments provides the analog of the pulse count at output terminal 84.

The hundredth pulse resets both the units and the tens decade counters and applies a pulse to the input of the hundreds counter 14. This in turn triggers the first multivibrator, the output of which is coupled through amplifier 26 to diode 51. Diode 51 is now cut off and current will flow from the negative regulated voltage supply A through resistor 71 and diode 56 to the input of D.C. amplifier 40. Resistor 71 has one-tenth the resistance and ten times the conductance of resistor 66, and one one-hundredth of the resistance, or one hundred times the conductance, of resistor 62. This will result in a current flow one hundred times as great to the input of D.C. amplifier 40 as that which resulted from current flow through resistor 62, giving an analog output voltage one hundred times as great at output terminal 84. As will be appreciated, this process repeats itself until a total count of nine hundred ninety-nine is received.

The output voltage range and power of the converter depends solely upon the capabilities of the D.C. amplifier which can be easily adjusted using well known circuit techniques. In the preferred embodiment all of the diodes are silicon diodes and the fixed resistors are precision resistors accurate to the tolerance demands of the conversion. The only other parameters which determine overall conversion accuracy will be the reference voltage A and the D. C. amplifier 40. Supply voltage A can be any of the well known low impedance types of voltage supplies, the only requirement being that its internal impedance be small compared to resistors 62 to 74 in parallel. D.C. amplifier 40 has two adjustments, a bias adjustment at resistor 83, which in this embodiment, is the cathode resistor, and a feed-back adjustment shown as variable resistor 81. Since almost one hundred percent negative or degenerative feed-back is utilized in this type of circuit, amplifier 40 is extremely stable and requires very little adjustment once the initial adjustments are made. Tap 84 on resistor 83 is adjusted for zero input and resistor 81 is adjusted for full scale reading.

While silicon junction diodes have been utilized in the preferred embodiment because of the high front to back resistance ratio and high frequency response, etc., it is to be understood that other semi-conductor diodes can be utilized as well as vacuum tube diodes where frequency response and temperature requirements are not as stringent. Also contemplated is the use of relays in place of the germanium or silicon junction diodes. Relays of course have the disadvantages of contact resistance, arcing, and general mechanical instability.

Obviously many other modifications and variations of the present invention are possible in the light of the above teachings. It is therefore to be understood that within the scope of the appended claims the invention may be practiced otherwise than as specifically described.

What is claimed is:

1. A digital-to-analog converter comprising a plurality of decade counters, each of said decade counters producing binary output voltages in accordance with the number of input pulses, a plurality of resistors, a different one of said resistors corresponding to each of said binary output voltages, each of said resistors having a conductance proportional to the binary count of the corresponding binary output voltage, each of said resistors having one end connected to a reference voltage and the other end connected through a separate one of a plurality of first unidirectional coupling means to a summing means, a separate one of a plurality of second unidirectional coupling means connected between each one of said binary output voltages and said other end of said corresponding resistor, said binary voltages being of a polarity and amplitude to cut-off said unidirectional coupling means, all of said 1st and 2nd unidirectional coupling means connected for coupling current through said resistors in the same direction, whereby upon the presence of one or more of said binary output voltages said second unidirectional coupling means will be cut-off allowing signal current to flow from said reference voltage through said first coupling means to said summing means.

2. The digital-to-analog converter of claim 1 wherein said summing means comprises a D.C. amplifier having high degenerative feedback.

3. The digital-to-analog converter of claim 1 wherein said 1st unidirectional coupling means comprise semi-conductors.

4. The digital-to-analog converter of claim 3 wherein said semi-conductors comprise silicon rectifiers.

5. The digital-to-analog converter of claim 4 wherein each of said 2nd unidirectional coupling means comprises a D.C. amplifier and a semi-conductor in serial relationship.

6. The digital-to-analog converter of claim 5 wherein said semi-conductors comprise silicon rectifiers.

References Cited in the file of this patent

UNITED STATES PATENTS 2,869,115 Doeleman et al. ---------- Jan. 13, 1959

FOREIGN PATENTS 1,072,063 France ---------------- Mar. 10, 1954